United States Patent
Ka et al.

(10) Patent No.: US 8,268,283 B2
(45) Date of Patent: Sep. 18, 2012

(54) CRYSTALLINE CARBONACEOUS MATERIAL WITH CONTROLLED INTERLAYER SPACING AND METHOD OF PREPARING SAME

(75) Inventors: Bok-Hyun Ka, Yongin-si (KR); Kyeu-Yoon Sheem, Yongin-si (KR); Da-Un Han, Yongin-si (KR); Hyun-Uk Jo, Yongin-si (KR); Sumihito Ishida, Yongin-si (KR); Eui-Hwan Song, Yongin-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 0 days.

(21) Appl. No.: 13/005,503

(22) Filed: Jan. 12, 2011

(65) Prior Publication Data

US 2011/0311431 A1     Dec. 22, 2011

(30) Foreign Application Priority Data

Jun. 17, 2010   (KR) .................. 10-2010-0057760

(51) Int. Cl.
    *C01B 31/04*     (2006.01)
(52) U.S. Cl. .................. 423/448; 423/445 R
(58) Field of Classification Search .................. 423/448, 423/445 R, 460; 977/734, 842
    See application file for complete search history.

(56) References Cited

U.S. PATENT DOCUMENTS

| | | | | |
|---|---|---|---|---|
| 4,915,925 A | * | 4/1990 | Chung | ............. 423/447.1 |
| 5,595,838 A | | 1/1997 | Yamada et al. | |
| 5,698,088 A | * | 12/1997 | Kang et al. | ............. 205/555 |
| 5,706,165 A | | 1/1998 | Saito et al. | |
| 5,773,167 A | | 6/1998 | Iwasaki et al. | |
| 6,455,199 B1 | * | 9/2002 | Kitagawa et al. | ........ 429/231.8 |
| 6,669,919 B1 | * | 12/2003 | Greinke | ............. 423/448 |
| 6,946,110 B2 | | 9/2005 | Nishimura et al. | |
| 2006/0133980 A1 | | 6/2006 | Nanba et al. | |

FOREIGN PATENT DOCUMENTS

| | | |
|---|---|---|
| JP | 08-335460 | 12/1996 |
| JP | 2008-047853 | 2/2008 |
| JP | 2008-205485 | 9/2008 |
| JP | 2009-130066 | 6/2009 |
| KR | 10-2000-0068703 | 11/2000 |
| KR | 1020050022096 | 3/2005 |
| KR | 10-2006-0095487 | 8/2006 |
| KR | 1020080060026 | 7/2008 |
| KR | 10-2009-0027885 | 3/2009 |
| KR | 1020090088530 | 8/2009 |

OTHER PUBLICATIONS

Furdin, Exfoliation process and elaboration of new carbonaceous materials, Fuel 1998; 77(6): 479-485.*
Korean Office Action issued by the Korean Patent Office on Oct. 24, 2011 in the corresponding Korean Application No. 10-2010-0057760.

* cited by examiner

*Primary Examiner* — Daniel C. McCracken
(74) *Attorney, Agent, or Firm* — Robert E. Bushnell, Esq.

(57) ABSTRACT

A crystalline carbon material with controlled interlayer spacing and a method of manufacturing the crystalline carbon material are disclosed. The crystalline carbon material has peaks of a (002) plane at $2\theta=23°\pm5.0°$ and $2\theta=26.5°\pm1.0°$ when X-ray diffraction is measured using a CuKα ray. The peak height at $2\theta=23°\pm5.0°$ is higher than the one at $2\theta=26.5°\pm1.0°$.

20 Claims, 3 Drawing Sheets

CRYSTALLINE CARBONACEOUS MATERIAL WITH CONTROLLED INTERLAYER SPACING AND METHOD OF PREPARING SAME

CLAIM OF PRIORITY

This application makes reference to, incorporates the same herein, and claims all benefits accruing under 35 U.S.C. §119 from an application earlier filed in the Korean Intellectual Property Office on 17 Jun. 2010 and there duly assigned Serial No. 10-2010-0057760.

BACKGROUND OF THE INVENTION

1. Field of the Invention

Embodiments of the present invention relate to a crystalline carbonaceous material with a controlled interlayer spacing and a method of manufacturing the same.

2. Description of the Related Art

An energy storage device based on electrochemical reaction includes two electrodes, an electrolyte that transfers ions, and a separation film.

The electrochemical reaction of the energy storage device is mostly a surface reaction occurring on the surface of an electrode, and is mostly a non-uniform reaction.

The reaction may be categorized as a mass transfer reaction where chemical species dissociated from the electrolyte are transferred to the surface of an electrode; a non-faradaic reaction, which is an adsorption/desorption reaction where the transferred chemical species form a layer called as an electric double layer on the surface of an electrode; or a faradaic reaction, which is an electron transfer reaction where electrons are directly received and oxidized (or reduced).

SUMMARY OF THE INVENTION

One embodiment of the present invention provides a crystalline carbon material having high capacity.

Another embodiment of the present invention provides a method of manufacturing the crystalline carbonaceous material.

In accordance with one embodiment of the present invention, a crystalline carbonaceous material with a controlled interlayer spacing is provided. The crystalline carbonaceous material has peaks of a crystal plane (002) at scattering angles $2\theta=23°\pm5.0°$ and $2\theta=26.5°\pm1.0°$, when its X-ray diffraction is measured using a CuK$\alpha$ ray. The peak height at $2\theta=23°\pm5.0°$ is higher than the peak height at $2\theta=26.5°\pm1.0°$. $2\theta$ here refers to the scattering angle of the CuK$\alpha$ ray. More specifically, when the CuK$\alpha$ ray strikes the crystal plane (002), the incident angle of the CuK$\alpha$ ray is $\theta$, and the scattering angle of the CuK$\alpha$ ray is $2\theta$.

The carbon material may have a peak ratio (b/a) ranging from 0.01 to 0.99 between the peak height (b) at $2\theta=26.5°\pm1.0°$ and the peak height (a) at $2\theta=23°\pm5.0°$.

The carbon material may be used for a capacitor, and in particular, for an asymmetrical capacitor.

In accordance with another embodiment of the present invention, a method of manufacturing a carbon material with a controlled interlayer spacing is provided that includes adding an oxidizing agent to a mixture of crystalline carbon and acid in order to oxidize the crystalline carbon, drying the resulting oxidized crystalline carbon, primarily heat-treating the dried product under vacuum by increasing a temperature at an increasing rate ranging from 0.3° C./min to 5.0° C./min up to a temperature ranging from 150° C. to 250° C., and secondarily heat-treating the resulting product under an inert atmosphere by increasing a temperature at an increasing rate of 5.0° C./min to 10.0° C./min to a temperature ranging from 250° C. to 600° C. and maintaining it at the temperature.

The oxidizing agent is added to the mixture through 10 to 100 steps in an amount ranging from 5 to 15 parts each step by weight based on 100 parts by weight of the crystalline carbon.

Herein, the oxidizing agent may be entirely added in an amount ranging from 50 to 700 parts by weight based on 100 parts by weight of the crystalline carbon.

In accordance with one embodiment of the present invention, a crystalline carbon material with a controlled interlayer spacing may provide a capacitor having improved capacity and decreased resistance.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
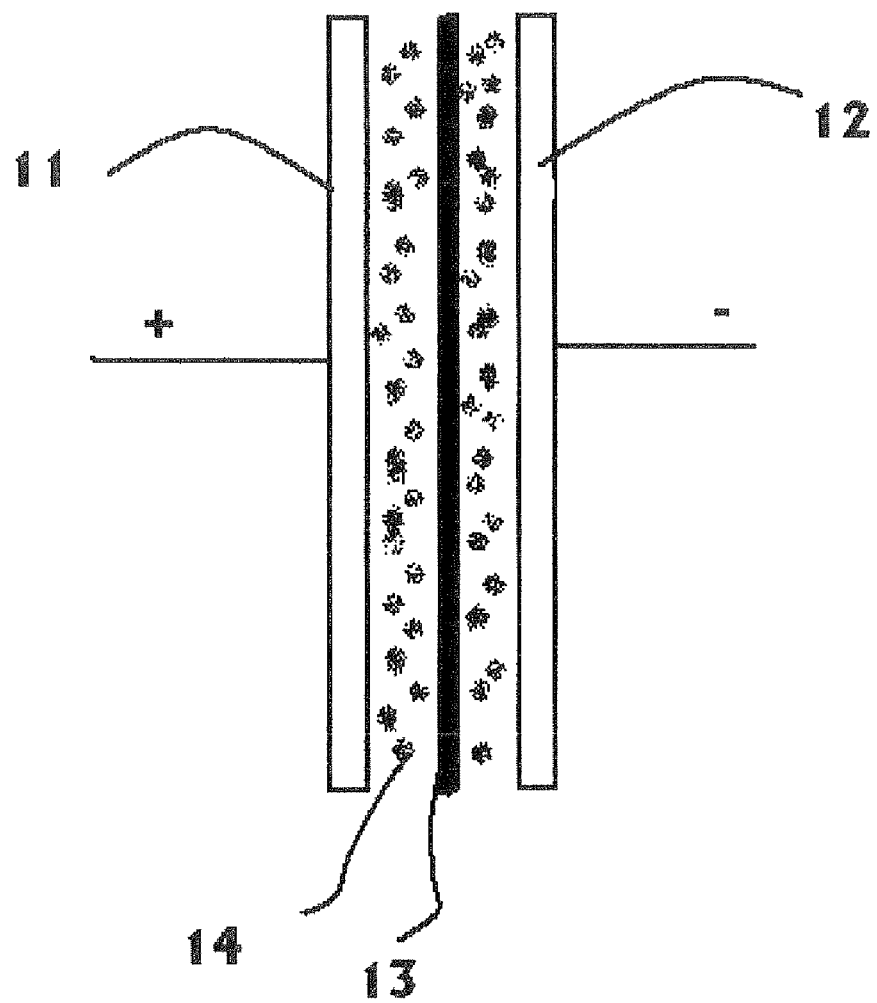
FIG. 1 shows a structure of capacitor including active material.

Embodiments of this disclosure will hereinafter be described in detail. These embodiments are however only exemplary, and this disclosure is not limited thereto.

Among the energy storages, super capacitors (or electric bilayer capacitors) use the non-faradaic reaction. Among the energy storages, lithium rechargeable batteries use the faradaic reaction.

The surface area of an active material of the super capacitor should be increased in order to have an increased capacity.

Much research has been conducted on the topic of increasing the surface area of an active material, for example, research disclosed in U.S. Pat. No. 5,706,165 and Korean Patent Laid-open No. 10-2006-0095487.

Many attempts are however still being made to increase the surface area of an active material.

Among energy storage devices, a super capacitor fabricated by considering simple ion absorption using a non-faradaic phenomenon may have capacity proportionate to the surface area of an active material forming an electrode.

Accordingly, one embodiment of the present invention increases the surface area of an active material.

Another embodiment of the present invention provides a method of preparing a crystalline carbon material with a controlled interlayer spacing, which has two peaks of a (002) plane at $2\theta=23°\pm5.0°$ and $2\theta=26.5°\pm1.0°$ when the X-ray diffraction (XRD) is measured using CuK$\alpha$ ray. The peak height at $2\theta=23°\pm5.0°$ is higher than the one at $2\theta=26.5°\pm1.0°$. The crystalline carbon material may be formed by multiple atom layers. In each atom layer, the carbon atoms are arranged in a lattice, and the distance between atom layers is called an interlayer spacing. In the present invention, the interlayer spacing may be controlled by manufacturing process. The peak at $2\theta=23°\pm5.0°$ shows the existence of the expanded interlayer spacing d002, and the peak at 2θ=26.5°±1.0° shows the existence of the regular interlayer spacing d002. The expanded interlayer spacing d002 is 0.36 nm-0.8 nm, and the regular interlayer spacing d002 is 0.345 nm-0.36 nm. The regular interlayer spacing d002 refers to an original distance between the adjacent atom layers which are formed in crystal plane (002) and the original distance is maintained during and after heat treatment; the expanded interlayer spacing d002 refers an expanded distance between the adjacent atom layers which are formed in crystal plane (002) and the expanded interlayer spacing d002 is expanded from the regular interlayer spacing d002 during and after the crystalline carbon is treated by heat treatments.

The carbon material may have a peak ratio (b/a) ranging from 0.01 to 0.99 between the peak height (b) at 2θ=26.5°±1.0° and the one (a) at 2θ=23°±5.0°.

In addition, the carbon material may have a peak ratio (b/a) ranging from 0.01 to 0.1 between the peak height (b) at 2θ=26.5°±1.0° and the one (a) at 2θ=23°±5.0°.

The carbon material having a higher peak at 2θ=23°±5.0° than at 2θ=26.5°±1.0° has an expanded interlayer spacing and thus may have effects on decreasing resistances due to ion absorption/desorption.

In particular, when the carbon material has a peak ratio (b/a) ranging from 0.01 to 0.99 between the peak height (b) at 2θ=26.5°±1.0° and the one (a) at 2θ=23°±5.0°, the carbon material may have more improved effects on decreasing resistances.

These XRD properties of the crystalline carbon material may indicate whether the crystalline carbon material has a controlled interlayer spacing.

Accordingly, when a carbon material constructed as one embodiment of the present invention is measured regarding X-ray diffraction using a CuKα ray, it may have interlayer spacing d002 ranging from 0.34 nm to 1 nm. The interlayer spacing d002 refers to a distance disposed the adjacent layers which are formed in crystal plane (002).

This interlayer spacing is called expanded interlayer spacing.

In accordance with one embodiment of the present invention, the carbon material may be usefully applied to a capacitor, and in particular, to an asymmetrical capacitor.

When the carbon material has an interlayer spacing d002 within the range from 0.34 nm to 1 nm, cations and anions of an electrolytic salt of an electrolyte used in a capacitor may not only be easily absorbed and desorbed among the layers therein, but may also be intercalated/deintercalated even when a high voltage is not applied.

Since the capacitor has ion intercalation/deintercalation among layers as in a rechargeable lithium battery, higher capacity may be provided.

Resultantly, the carbon material may have no decomposition problem of an electrolyte on the surface of an electrode even when a high voltage is applied onto the carbon material in order to use ion intercalation/deintercalation among layers as in a rechargeable lithium battery.

In addition, since the carbon material with controlled interlayer spacing is crystalline according to one embodiment of the present invention, the carbon material may include fewer cavities than amorphous carbon and thus has high conductivity.

Accordingly, since the carbon material has interlayer spacing for absorbing/desorbing desolvated ions and may maintain conductivity, the carbon material may have maximized diffusion characteristics.

In general, a capacitor may include the same carbon material for positive and negative active materials, in particular, activated carbon having an enlarged surface area, and this is called a symmetrical capacitor.

This capacitor is an electrical energy device including ion electrical double layers formed on the interface of a carbon material bordering with electrons arranged on the surface of the carbon material when a current is applied thereto, and thereby is able to instantly charge and discharge the current.

As shown in FIG. 1, the capacitor 10 may include a positive electrode 11 including the current collector and the active material, a negative electrode 12 including the current collector and the active material, and a separator 13 disposed between the positive electrode 11 and the negative electrode 12 and electrically insulating the positive electrode 11 from the negative electrode 12. The active material may be formed on the surface of the current collector. The ion electrical double layer refers to two parallel layers of electric charges disposed at the surface of the active carbon material. The electrolyte 14 is disposed to fill the space between the separator 13 and the electrodes.

Since this capacitor has energy storage simply proportionate to the surface area of a carbon material, there is much research on increasing the surface area to increase capacity (activation research). The surface area is however difficult to increase to more than 3500 $m^2/g$.

Recently, there has been research on another capacitor including a different material for positive and negative electrodes to accomplish higher capacity, which is called an asymmetrical capacitor.

As aforementioned, a carbon material constructed as one embodiment of the present invention may be usefully applied to an asymmetrical capacitor as well as a general capacitor.

The asymmetrical capacitor may include carbon material with different structures respectively for forming positive and negative active materials or a lithium intercalation compound emitting lithium ions used for a rechargeable lithium battery for either of positive and negative active materials.

In one embodiment of the present invention, the carbon material may have a specific surface area ranging from 5 $m^2/g$ to 100 $m^2/g$. In another embodiment, the carbon material may have a surface area ranging from 5 $m^2/g$ to 80 $m^2/g$.

When the carbon material having a specific surface area within these above ranges is applied to a capacitor, in particular an asymmetric capacitor, an electrolyte decomposition may be minimized.

In addition, the carbon material constructed as one embodiment of the present invention may have tap density ranging from 0.5 g/cc to 1.5 g/cc.

When the carbon material has tap density within the range from 0.5 g/cc to 1.5 g/cc, the carbon material may bring about higher capacity per unit volume.

Furthermore, the carbon material may have surface pH ranging from 5 to 8.

The crystalline carbon has interlayer spacing, and for example, the crystalline carbon may include natural graphite, artificial graphite, mesophase carbon microbeads, or a combination thereof.

The artificial graphite is soft carbon acquired through heat treatment at 2500° C. or higher.

In accordance with another embodiment of the present invention, provided is a method of manufacturing the carbon material with interlayer spacing, and the method includes steps of (1) oxidizing the crystalline carbon by adding an oxidizing agent into a mixture of crystalline carbon and acid, (2) drying the oxidized crystalline carbon resulted from step (1), (3) primarily heating the dried product under vacuum by increasing a temperature at an increasing rate of 0.3° C./min to 5.0° C./min to a temperature ranging from 150° C. to 250°

C., and (4) secondarily heating the heated product resulted from step (3) under inert atmosphere by increasing a temperature at an increasing rate ranging from 5.0° C./min to 10.0° C./min to a temperature ranging from 250° C. to 600° C. and maintaining the heated product under the increased temperature.

Figure 2:
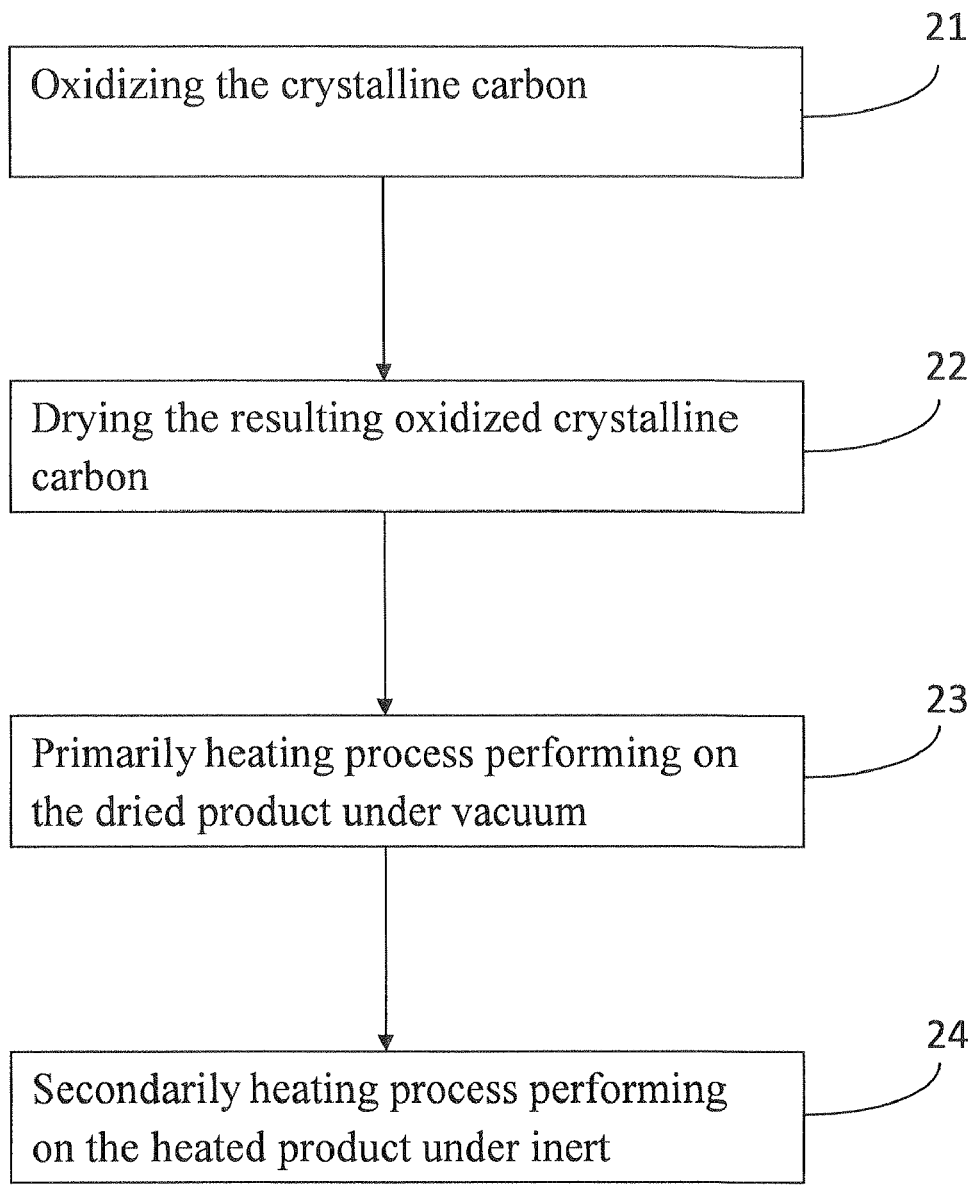
FIG. 2 is a flow chart showing steps manufacturing carbon material with an expanded interlayer spacing in accordance with another embodiment of the present invention.

Hereinafter, each step will be illustrated in FIG. 2.

In the first step (1) 21, an oxidizing agent is added to a mixture of crystalline carbon and acid in order to oxidize the crystalline carbon.

The mixture may be prepared by adding acid to crystalline carbon.

Herein, the crystalline carbon may include natural graphite, artificial graphite, mesophase carbon microbeads, or a combination thereof.

The artificial graphite refers to soft carbon acquired through heat treatment at 2500° C. or higher.

The acid may include $H_2SO_4$, $HNO_3$, $H_3PO_4$, $H_4P_2O_7$, $H_3AsO_4$, HF, $H_2SeO_4$, $HClO_4$, $CF_3COOH$, $BF_3(CH_3COOH)_2$, $HSO_3F$, $H_5IO_6$, or a combination thereof.

The crystalline carbon and acid may be mixed in an appropriate ratio. For example, the crystalline carbon and acid are mixed in a ratio ranging from 1:15 to 1:100.

The oxidizing agent may include $KMnO_4$, $NaNO_3$, $KClO_3$, $NaClO_3$, $NH_4ClO_3$, $AgClO_3$, $HClO_3$, $NaClO_4$, $NH_4ClO_4$, $CrO_3$, $(NH_4)_2S_2O_8$, $PbO_2$, $MnO_2$, $As_2O_5$, $Na_2O_2$, $H_2O_2$, $N_2O_5$, or a combination thereof.

The oxidizing agent may be added through 10 to 100 steps in an amount ranging from 5 to 15 parts each step by weight based on 100 parts by weight of crystalline carbon. Accordingly, the oxidizing agent may be totally included in an amount ranging from 50 to 1500 parts by weight based on 100 parts by weight of crystalline carbon. The oxidizing agent may be totally included in an amount ranging from 50 to 700 parts by weight based on 100 parts by weight of crystalline carbon.

The oxidizing agent is preferably added in an amount ranging from 5 to 15 parts by weight through 10 to 100 steps than all at once to cause uniform oxidation, in order to prepare a carbon material with more uniform interlayer spacing.

When the oxidizing agent is added to the mixture, crystalline carbon is oxidized. The resulting mixture is allowed to stand for better oxidation for 1 to 10 days.

In the second step (2) 22, the oxidized crystalline carbon is dried.

The step of drying may be performed by separating the oxidized crystalline carbon from the acid and the oxidizing agent and then washing the oxidized crystalline carbon in order to improve purity in a shorter time.

The drying may be performed at a temperature ranging from 100° C. to 150° C.

The drying is performed for a sufficient time to remove moisture from the oxidized crystalline carbon, and has no particular limit.

In the third step (3) 23, the dried product is primarily heat-treated under vacuum by increasing a temperature at an increasing rate ranging from 0.3° C./min to 5.0° C./min to a temperature ranging from 150° C. to 250° C.

The vacuum state may range from 0.01 mbar to 0.1 mbar.

When the primary heat treatment is performed under this vacuum degree, gas generated during the heat treatment may be easily discharged and may be partly suppressed from instant generation. Accordingly, a carbon material may be prepared to have a minimum shape change and a controlled interlayer spacing.

The primary heat treatment may be performed for 0.5 to 12.0 hours.

In the fourth step (4) 24, the primarily heat-treated product is secondarily heat-treated under an inert atmosphere by increasing a temperature at an increasing rate ranging from 5.0° C./min to 10.0° C./min at a temperature ranging from 250° C. to 600° C.

The temperature may be maintained for 1 to 24 hours.

When the temperature is maintained for 1 to 24 hours, the carbon material may have appropriate crystallinity.

In addition, when the secondary heat treatment is performed out of the above mentioned temperature range, it is difficult to control interlayer spacing of the carbon material. Accordingly, the carbon material which is made under a temperature out of the above mentioned temperature range may have a similar interlayer spacing d002 to that of common graphite, and thus deteriorated crystallinity.

The inert atmosphere may include nitrogen, argon, or a combination thereof.

When the heat treatment is gradually performed at a predetermined increasing rate of a temperature, the acid and the oxidizing agent among layers may be released at a low speed, resultantly preparing a material with high density.

Conversely, when the heat treatment is performed by instantly increasing to a high temperature (e.g., 900° C.), acid and an oxidizing agent may be instantly released as gas. Since a crystalline carbon material may thereby have severely expanded interlayer spacing and may be partly broken, the crystalline carbon material may have an improved surface area but a sharply decreased density. Accordingly, the crystalline carbon material may have a problem of less absorption per unit volume. This problem may be prevented by the previously discussed method according to one embodiment of the present invention.

Furthermore, the previously discussed method according to one embodiment of the present invention may provide a carbon material with excellent conductivity by developing a graphite layer therein through non-uniform reaction.

The carbon material layer may include a graphite layer including both a perfect graphite crystal layer and an expanded gap between the layers (2 phases). The carbon material layer may include a double-phrase graphite layer including both a perfect graphite crystal layer and an expanded graphite crystal layer. The perfect graphite crystal layer refers to a regular interlayer spacing d002.

When the double-phased crystalline composite graphite is prepared by effectively controlling an interlayer spacing of graphite, two significant peaks are shown at $2\theta=26.5°$ and between 10° to 26.5° measured by XRD diffraction.

The capacitor including a carbon material with a controlled interlayer spacing according to one embodiment may include an electrolyte.

Herein, the electrolyte may include a solvent, cations, and anions.

The solvent may include propylene carbonate, ethylene carbonate, dimethyl carbonate, diethyl carbonate, ethylmethyl carbonate, 1,2-butylene carbonate, sulfolane, acetonitrile, γ-butyrolactone, dimethyl ether, diethyl ether, tetrahydrofuran, or a combination thereof.

The cation may include tetramethyl ammonium, ethyltrimethyl ammonium, diethyldimethyl ammonium, triethylmethyl ammonium, tetraethylammonium, dimethylpyrrolidium, ethylmethylpyrrolidium, piperidine-spiropyrrolidium, spiro-bipiperidinium, 1-ethyl-3-methylimidazolium, 1,2-dimethyl-3-propylimidazolium, 1,2-diethyl-3,5-dimethylimidazolium, trimethyl-n-hexyl ammonium, N-butyl-N-methylpyrrolidium, N-methyl-N-propylpiperidinium, N-ethyl-N-methylmorphonium, or a combination thereof.

The anion may include $BF_4^-$, $PF_6^-$, $ClO_4^-$, $AsF_6^-$, trifluoromethane sulfonate, bis(trifluoromethanesulfonyl)imide, bis(pentafluoroethanesulfonyl)imide, bis(fluorosulfonyl)imide, 2,2,2-trifluoro-N-(trifluoromethanesulfonyl)acetamide, pentafluoroethane trifluoroborate, tri(pentafluoroethane)trifluorophosphate, or a combination thereof.

These cation and anion have a size ranging from 0.20 nm to 0.45 nm and thus may be well diffused into layers of a carbon material with interlayer spacing between 0.335 nm or less and less than 1 nm according to one embodiment of the present invention.

The following examples illustrate this disclosure in more detail.

The following examples are embodiments and the present invention is not limited to the following examples.

EXAMPLE 1

Mesophase carbon microbeads (MCMB) (artificial graphite prepared by heat-treating soft carbon at 2800° C., Osaka gas Co. Ltd.) were mixed with acid.

The acid was a solution prepared by mixing concentrated sulfuric acid (98 volume % concentration) and nitric acid (63 volume % concentration) in a volume ratio of 1:3.

The MCMB and the acid were mixed in a weight ratio of 1:27.

Next, a potassium permanganate oxidizing agent was added to the mixture. The potassium permanganate was added by ten (10) separate steps in an amount of 50 parts by weight each step based on 100 parts by weight of MCMB. Thus, the entire amount of the potassium permanganate was 500 parts by weight based on 100 parts by weight of MCMB.

Then, the resulting product was allowed to stand for 48 hours.

Herein, the sulfuric acid, the nitric acid, and the potassium permanganate were inserted among the MCMB layers and thus oxidized the MCMB.

After the reaction, the product was filtrated to obtain the oxidized MCMB. The obtained MCMB was washed with distilled water until it became pH neutral.

The washed product was sufficiently dried in a 120° C. oven to remove moisture therein.

The resulting MCMB was primarily heat-treated by increasing a temperature to 150° C. at an increasing rate of 2° C./min under a 0.05 mbar vacuum condition and then maintained at the same temperature for 6 hours.

Next, it was secondarily heat-treated by increasing a temperature to 250° C. at an increasing rate of 5° C./min or less, while implanting nitrogen at a rate of 10 mL/min, and maintained at the same temperature for 12 hours.

Through these processes, a crystalline carbon material with a controlled interlayer spacing was prepared.

EXAMPLE 2

A crystalline carbon material with controlled interlayer spacing was prepared by the same method as Example 1, except for secondarily heating it by increasing a temperature to 300° C. at an increasing rate of 5° C./min or less, while implanting nitrogen into the primarily heat-treated product at a rate of 10 mL/min, and then maintaining it for 12 hours.

EXAMPLE 3

A crystalline carbon material with a controlled interlayer spacing was prepared by the same method as Example 1, except for secondarily heating it by increasing a temperature to 500° C. at an increasing rate of 5° C./min or less, while implanting nitrogen into the primarily heat-treated product at a rate of 10 mL/min, and then maintaining it for 12 hours.

EXAMPLE 4

A crystalline carbon material with a controlled interlayer spacing was prepared by the same method as Example 1, except for secondarily heating it by increasing a temperature to 700° C. at an increasing rate of 5° C./min or less, while implanting nitrogen into the primarily heat-treated product at a rate of 10 mL/min, and then maintaining it for 12 hours.

COMPARATIVE EXAMPLE 1

A crystalline carbon material with a controlled interlayer spacing was prepared by the same method as Example 1, except for secondarily heating it by increasing a temperature to 900° C. at an increasing rate of 5° C./min or less, while implanting nitrogen into the primarily heat-treated product at a rate of 10 mL/min, and then maintaining it for 12 hours.

COMPARATIVE EXAMPLE 2

A carbon material was prepared by heat-treating the MCMB oxidized according to Example 1 in a 900° C. oxidizing furnace for 10 seconds.

EXAMPLES 5 to 8

In Examples 5 to 8, the carbon active materials according to Examples 1 to 4 were respectively mixed with a carbon black conductive material, and a polyvinylidene fluoride binder dissolved in an N-methylpyrrolidone solvent, preparing an active material slurry.

Herein, the active material, the conductive material, and the binder were used in an amount of 85 wt %, 5 wt %, and 10 wt %, respectively.

The slurry was coated on an aluminum current collector and then sufficiently dried in a 120° C. oven, fabricating an electrode.

This electrode was cut to a size of 2 cm$^2$ and then used as positive and negative electrodes. On the other hand, an electrolyte solution was prepared by dissolving 1 mol of TEABF$_4$ (TEA: tetraethylammonium) in a propylene carbonate solvent. The positive and negative electrodes and the electrolyte solution were used together to fabricate a symmetrical capacitor.

The symmetrical capacitor was charged and discharged to 0.5 mA/cm$^2$ and 10 mA/cm$^2$ in a stepwise fashion to evaluate capacity and output.

COMPARATIVE EXAMPLES 3 and 4

A symmetrical capacitor was fabricated by the same method as Example 5, except for respectively using the carbon materials according to Comparative Examples 1 and 2.

EXAMPLES 9 to 12

A symmetrical capacitor was fabricated by the same method as Examples 5 to 8, except for using 1 mol of LiBF$_4$ instead of 1 mol of TEABF$_4$.

COMPARATIVE EXAMPLES 5 and 6

A symmetrical capacitor was fabricated by the same method as Examples 3 to 4, except for respectively using the carbon materials according to Comparative Examples 1 and 2 and 1 mol of $LiBF_4$ instead of 1 mol of $TEABF_4$.

COMPARATIVE EXAMPLE 7

A symmetrical capacitor was fabricated by the same method as Example 5, except for using activated carbon as an active material.

COMPARATIVE EXAMPLE 8

A symmetrical capacitor was fabricated according to the same method as Example 5, except for using activated carbon as an active material and 1 mol of $LiBF_4$ instead of 1 mol of $TEABF_4$.

The carbon materials according to Examples 1 to 4 and Comparative Examples 1 to 2 were respectively measured regarding d002, tap density, and specific surface area. The results are provided in the following Table 1.

In addition, the MCMB and the activated carbon (RP20, Kuraray Co.) used in Example 1 were measured regarding d002, tap density, and specific surface area. The results are provided in the following Table 1.

TABLE 1

Characteristics of a carbon material with controlled interlayer spacing according to heat treatment temperature

| | Expanded interlayer spacing d002 (nm) | Interlayer spacing d002 (nm) | Tap density (g/cc) | Specific surface area (m²/g) |
|---|---|---|---|---|
| Example 1 | 0.404 | 0.336 | 1.1 | 21.8 |
| Example 2 | 0.385 | 0.335 | 1.15 | 25.7 |
| Example 3 | 0.358 | 0.335 | 1.35 | 37.3 |
| Example 4 | 0.345 | 0.335 | 1.17 | 58.4 |
| Comparative Example 1 | — | 0.338 | 1.10 | 73 |
| Comparative Example 2 | — | 0.337 | 0.03 | 213 |
| MCMB | | 0.335 | 1.56 | 14 |
| Activated carbon | — | — | 0.32 | 2430 |

As shown in Table 1, since the activated carbon was activated to have a high surface area, it was mostly damaged with respect to crystallinity and thus had almost no peak that carbon intrinsically has at 26.5°, that is to say, no d002 interlayer spacing.

Furthermore, since the carbon materials heat-treated at 900° C. according to Comparative Examples 1 and 2 emitted most of the acid and oxidizing agent inserted between the layers, they had no expanded interlayer spacing d002 but had only a similar interlayer spacing d002 to a common graphite structure.

In particular, the expanded graphite according to Comparative Example 2 had tap density of 0.03 g/cc, which is very much lower than 1.56 g/cc of graphite.

This result shows that the expanded graphite according to Comparative Example 2 had a considerably destroyed intrinsic interlayer structure, since sulfuric acid, nitric acid, and the oxidizing agent inserted therein were rapidly spread when the oxidized graphite was exposed to air at a high temperature for a short time.

In other words, the expanded graphite according to Comparative Example 2 had an intrinsic graphite interlayer structure that was considerably destroyed and thus had a partly layered foam shape.

Accordingly, since the expanded graphite according to Comparative Example 2 had a small specific surface area but mostly large cavities compared with activated carbon, it had a similar size to graphite but very low tap density.

On the other hand, the carbon materials according to Examples 1 to 4 included both an expanded interlayer spacing d002 and a regular interlayer spacing d002, since they had some interlayers having an expanded space therebetween but other interlayers that were not affected at all.

In this way, since the carbon materials according to Examples 1 to 4 included an expanded interlayer spacing d002, cation/anion can be advantageously inserted between their layers compared with the expanded graphite according to Comparative Examples 1 and 2 as well as common graphite.

In addition, the carbon materials according to Examples 1 to 4 gradually discharged acid and oxidizing agent inserted inside graphite by heat-treating them at 700° C. or less and regulating their vacuum degree and increasing temperature rate, and thus secured uniformly expanded spacing among crystal lattices. As a result, the carbon materials according to Examples 1 to 4 had excellent tap density and specific surface area.

In addition, the crystalline carbon materials with controlled interlayer spacing according to Examples 1 and 2 and Comparative Example 1 were measured regarding X-ray diffraction using $CuK\alpha$ ray. The results are provided in FIG. 3.

Figure 3:
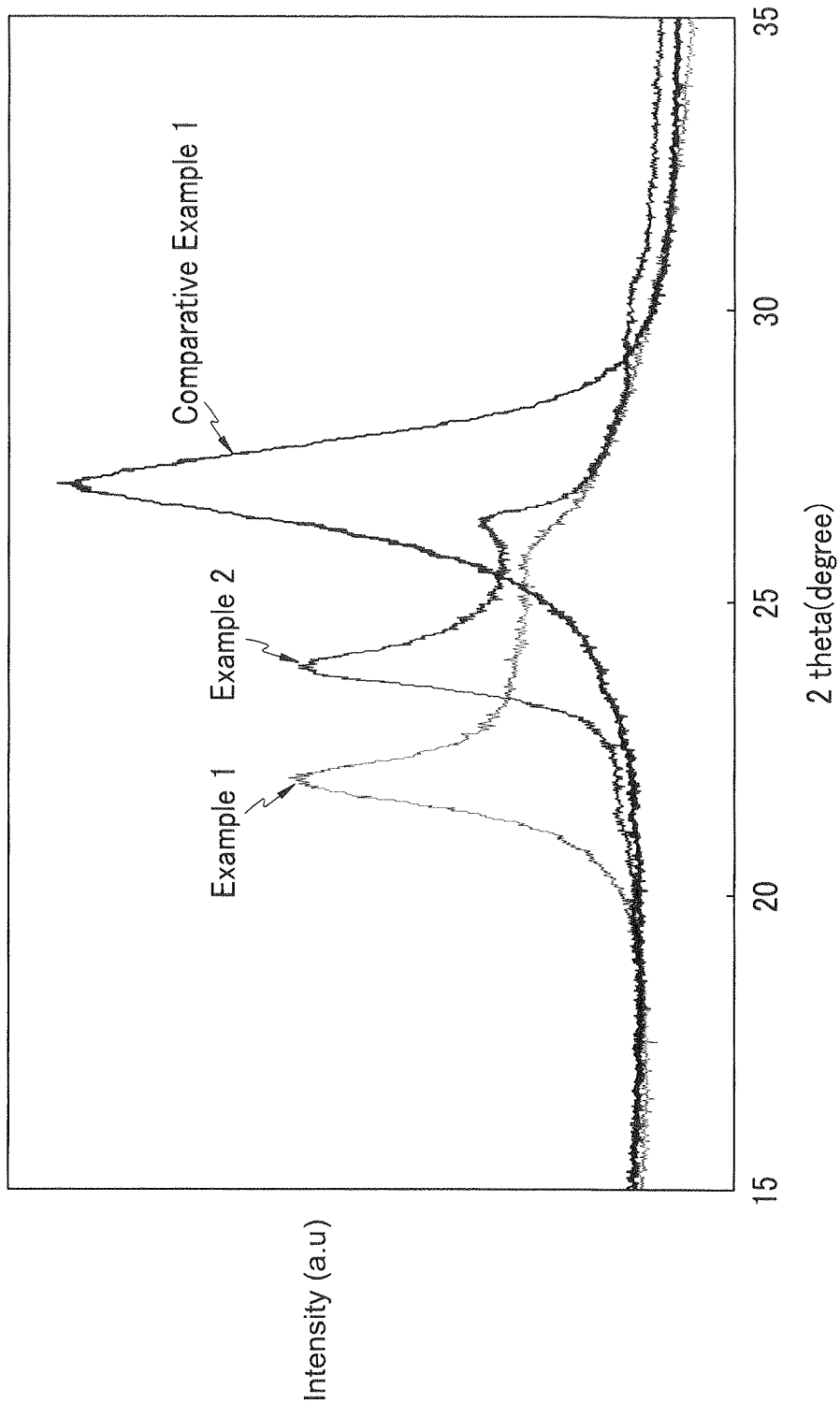
FIG. 3 is a graph showing X-ray diffraction experimental results of a carbon material constructed as Example 1, which is measured by using CuK$\alpha$ ray.

As shown in FIG. 3, Examples 1 and 2 respectively had peaks at around $2\theta=23.5°$ and $2\theta=26°$ and these peaks meet the requirements that $2\theta=23°\pm5.0°$ and $2\theta=26.5°\pm1.0°$. Accordingly, the carbon materials had two peaks such as the expanded interlayer spacing d002 and the interlayer spacing d002.

This result shows that oxidized graphite including acid and an oxidizing agent among the layers had no expanded morphology like expanded graphite, but included partly expanded lattices and partly crystalline graphite by regulating the rate of discharging acid and the oxidizing agent.

On the other hand, the product of Comparative Example 1 had a single peak around $2\theta=28°$. The carbon material had a single peak of an interlayer spacing d002.

The reason is that, during the manufacture of the product of Comparative Example 1, the secondary heat treatment was performed at an extremely high temperature.

In addition, the carbon materials according to Examples 1 to 4 and Comparative Example 1, graphite, and the expanded graphite and the activated carbon according to Comparative Example 2 were measured regarding a ratio (b/a) of a peak height (a) at $2\theta=23.5°$ and another peak height (b) at $2\theta=26°$, when X-ray diffraction was measured using $CuK\alpha$ ray. The result is provided in the following Table 2.

TABLE 2

| | Ratio of peak height (b/a) |
|---|---|
| Example 1 | 0.4 |
| Example 2 | 0.5 |
| Example 3 | 0.05 |
| Example 4 | 0.02 |
| Comparative Example 1 | — |
| Comparative Example 2 | — |
| MCMB | — |
| Activated carbon | — |

As shown in Table 2, the carbon materials according to Examples 1 to 4 had a ratio (b/a) between a peak height (a) at $2\theta=23.5°$ and another peak height (b) at $2\theta=26°$, which ranges from 0.02 to 0.5.

This result shows that the layers inside the carbon materials had expanded spacing through which ions could be easily diffused and in which pure crystalline graphite was mixed as a composite. Accordingly, the carbon materials with a controlled interlayer spacing among had excellent internal conductivity and ion-diffusing property compared with activated carbon or expanded graphite.

In addition, since the MCMB and the activated carbon had only one peak at $2\theta=26°$ in the X-ray diffraction measured using CuK$\alpha$ ray, their b/a value cannot be measured.

On the other hand, since Comparative Examples 1 and 2, which were heat-treated at 900° C., had no increased d002 peak, they were not calculated regarding their peak ratios (b/a). The graphite shows the same result.

In addition, since the activated carbon had no interlayer structure, it also had no peak ratio (b/a).

The symmetrical capacitors according to Examples 5 to 12 and Comparative Examples 3 to 8 were measured regarding capacitance and resistance. The results are provided in the following Table 3.

speed, and simultaneously included a pure crystalline carbon component, and was heat-treated at 700° C. or less.

EXAMPLE 13

The carbon active material according to Example 1 was mixed with a carbon black conductive material. Then, a polyvinylidene fluoride binder dissolved in an N-methylpyrrolidone solvent was added thereto, preparing an active material slurry.

Herein, the active material, the conductive material, and the binder were used in an amount of 85 wt %, 5 wt %, and 10 wt %.

The slurry was coated on an aluminum current collector and sufficiently dried in a 120° C. oven, fabricating an electrode.

This electrode was cut to have an area of 2 cm$^2$ and was used as a positive electrode.

On the other hand, an active material slurry was prepared by mixing 80 wt % of activated carbon having a specific

TABLE 3

Electrochemical characteristics of a carbon material with a controlled interlayer spacing according to a heat treatment temperature

| | Salt | Heat treatment temperature (° C.) | Capacitance (F/g) (applied current density: 0.5 mA/cm$^2$) | Capacitance (F/g) (applied current density: 10 mA/cm$^2$) | Resistance (n, 1 KHz) |
|---|---|---|---|---|---|
| Example 5 | TEABF$_4$ | 250 | 22 | 18 | 0.43 |
| Example 6 | TEABF$_4$ | 300 | 24 | 19 | 0.47 |
| Example 7 | TEABF$_4$ | 500 | 25 | 16 | 0.52 |
| Example 8 | TEABF$_4$ | 700 | 18 | 9.9 | 0.62 |
| Comparative Example 3 | TEABF$_4$ | 900 | 12 | 4.8 | 0.79 |
| Example 9 | LiBF$_4$ | 250 | 25 | 21 | 0.45 |
| Example 10 | LiBF$_4$ | 300 | 26 | 18 | 0.46 |
| Example 11 | LiBF$_4$ | 500 | 26 | 15 | 0.5 |
| Example 12 | LiBF$_4$ | 700 | 19 | 10 | 0.64 |
| Comparative Example 4 | TEABF$_4$ | 900 | 12 | 3 | 0.75 |
| Comparative Example 5 | LiBF$_4$ | 900 | 15 | 9 | 0.83 |
| Comparative Example 6 | LiBF$_4$ | 900 | 16 | 9.5 | 0.76 |
| Comparative Example 7 | TEABF$_4$ | — | 17 | 12 | 0.63 |
| Comparative Example 8 | LiBF$_4$ | — | 15 | 5.8 | 0.62 |

As shown in Table 3, Examples 5 to 12 show better results than Comparative Examples 3 to 8 regardless of TEABF$_4$ or LiBF$_4$ electrolytic salt.

In particular, the capacitors of Examples 5 to 8, which included the carbon materials having a gap among lattices controlled through the heat treatment at 700° C. or less at a low increasing rate according to Examples 1 to 4, turned out to have higher capacity than the capacitors of Comparative Examples 3 and 5, which included a carbon material heat-treated at 900° C. when a very high current of 10 mA/cm$^2$ is applied thereto, the ones of Comparative Examples 4 and 6 including expanded graphite, and the ones of Comparative Examples 7 and 8 including activated carbon.

Furthermore, the capacitors of Examples 5 to 8 have very small resistances, since they included the carbon materials of Examples 1 to 4 including a smoothly-working internal electronic network. The carbon materials had an interlayer structure that gradually changed through gas discharge at a low surface area of 1450 m$^2$/g, 10 wt % of a carbon black conductive material, and 10 wt % of a polyvinylidene fluoride binder. The active material slurry was coated on an aluminum current collector and sufficiently dried in a 120° C. oven, fabricating an electrode.

This electrode was cut to have an area of 2 cm$^2$ and was used as a negative electrode.

The positive and negative electrodes and an electrolyte solution prepared by dissolving 1 mol of TEABF$_4$ (TEA: tetraethylammonium) in a propylene carbonate solvent were used to fabricate an asymmetric capacitor.

This asymmetrical capacitor was charged and discharged with a working voltage ranging from 0 to 4.2V.

EXAMPLE 14

The carbon active material according to Example 1 was mixed with a carbon black conductive material. Then, a polyvinylidene fluoride binder dissolved in an N-methylpyrrolidone solvent was added thereto, preparing an active material slurry.

Herein, the active material, the conductive material, and the binder were respectively used in an amount of 85 wt %, 5 wt %, and 10 wt %.

The slurry was coated on an aluminum current collector and sufficiently dried in a 120° C. oven, fabricating an electrode.

This electrode was cut to have an area of 2 cm$^2$ and was used as a negative electrode.

On the other hand, 80 wt % of activated carbon having a specific surface area of 1450 m$^2$/g, 10 wt % of a carbon black conductive material, and 10 wt % of a polyvinylidene fluoride binder were mixed to prepare active material slurry. The active material slurry was coated on an aluminum current collector and sufficiently dried in a 120° C. oven, fabricating an electrode.

This electrode was cut to have an area of 2 cm$^2$ and was used as a positive electrode.

The positive and negative electrodes and an electrolyte solution prepared by dissolving 1 mol of TEABF$_4$ (TEA: tetraethylammonium) in a propylene carbonate solvent were used to fabricate an asymmetric capacitor.

The asymmetric capacitor was charged and discharged with a working voltage ranging from 0 to 4.2V.

EXAMPLE 15

The positive and negative electrodes according to Example 13 and an electrolyte solution prepared by dissolving LiBF$_4$ in a propylene carbonate solvent were used to fabricate an asymmetric capacitor.

This asymmetric capacitor was charged and discharged with a working voltage ranging from 0 to 3.2V.

EXAMPLE 16

The positive and negative electrodes according to Example 14 and an electrolyte solution prepared by dissolving LiBF$_4$ in a propylene carbonate solvent were used to fabricate an asymmetric capacitor.

This asymmetric capacitor was charged and discharged with a working voltage ranging from 0 to 3.2V.

EXAMPLE 17

The asymmetric capacitor according to Example 16 was charged and discharged with a working voltage ranging from 0 to 4.2V.

EXAMPLE 18

The asymmetric capacitor according to Example 15 was charged and discharged with a working voltage ranging from 0 to 4.2V.

COMPARATIVE EXAMPLE 9

The carbon active material according to Comparative Example 1 was mixed with a carbon black conductive material. Then, a polyvinylidene fluoride binder dissolved in an N-methylpyrrolidone solvent was added thereto, preparing an active material slurry.

Herein, the active material, the conductive material, and the binder were respectively used in an amount of 85 wt %, 5 wt %, and 10 wt %.

The slurry was coated on an aluminum current collector and sufficiently in a 120° C. oven, fabricating an electrode.

This electrode was cut to have an area of 2 cm$^2$ and was used as a positive electrode.

On the other hand, 80 wt % of activated carbon having a specific surface area of 1450 m$^2$/g, 10 wt % of a carbon black conductive material, and 10 wt % of a polyvinylidene fluoride binder were mixed to prepare active material slurry. The active material slurry was coated on an aluminum current collector and sufficiently dried in a 120° C. oven, fabricating an electrode.

This electrode was cut to have an area of 2 cm$^2$ and was used as a negative electrode.

The positive and negative electrodes and an electrolyte solution prepared by dissolving 1 mol of TEABF$_4$ (TEA: tetraethylammonium) in a propylene carbonate solvent were used to fabricate an asymmetric capacitor.

The asymmetric capacitor was charged and discharged with a working voltage ranging from 0 to 3.0V.

COMPARATIVE EXAMPLE 10

The carbon active material of Comparative Example 1 was mixed with a carbon black conductive material. Then, a polyvinylidene fluoride binder dissolved in an N-methylpyrrolidone solvent was added thereto, preparing an active material slurry.

Herein, the active material, the conductive material, and the binder were respectively used in an amount of 85 wt %, 5 wt %, and 10 wt %.

The slurry was coated on an aluminum current collector and sufficiently dried in a 120° C. oven, fabricating an electrode.

This electrode was cut to have an area of 2 cm$^2$ and was used as a negative electrode.

On the other hand, 80 wt % of activated carbon having a specific surface area of 1450 m$^2$/g was mixed with 10 wt % of a carbon black conductive material. 10 wt % of a polyvinylidene fluoride binder was added thereto, preparing an active material slurry. The active material slurry was coated on an aluminum current collector and sufficiently dried in a 120° C. oven, fabricating an electrode.

This electrode was cut to have an area of 2 cm$^2$ and was used as a positive electrode.

The positive and negative electrodes and an electrolyte solution prepared by dissolving 1 mol of TEABF$_4$ (TEA: tetraethylammonium) in a propylene carbonate solvent were used to fabricate an asymmetric capacitor.

The asymmetric capacitor was charged and discharged with a working voltage ranging from 0 to 3.0V.

COMPARATIVE EXAMPLE 11

The carbon active material according to Comparative Example 2 was mixed with a carbon black conductive material. Then, a polyvinylidene fluoride binder dissolved in an N-methylpyrrolidone solvent was added thereto, preparing an active material slurry.

Herein, the active material, the conductive material, and the binder were respectively used in an amount of 85 wt %, 5 wt %, and 10 wt %.

The slurry was coated on an aluminum current collector and sufficiently dried in a 120° C. oven, fabricating an electrode.

This electrode was cut to have an area of 2 cm$^2$ and was used as a positive electrode.

On the other hand, 80 wt % of activated carbon having a specific surface area of 1450 m²/g, 10 wt % of a carbon black conductive material, and 10 wt % of a polyvinylidene fluoride binder were mixed to prepare active material slurry. The active material slurry was coated on an aluminum current collector and sufficiently dried in a 120° C. oven, fabricating an electrode.

This electrode was cut to have an area of 2 cm² and was used as a negative electrode.

The positive and negative electrodes and an electrolyte solution prepared by dissolving 1 mol of $LiBF_4$ in a propylene carbonate solvent were used to fabricate an asymmetric capacitor.

This asymmetric capacitor was charged and discharged with a working voltage ranging from 0 to 3.0V.

COMPARATIVE EXAMPLE 12

The carbon active material of Comparative Example 2 was mixed with a carbon black conductive material. Then, a polyvinylidene fluoride binder dissolved in an N-methylpyrrolidone solvent was added thereto, preparing an active material slurry.

Herein, the active material, the conductive material, and the binder were respectively used in an amount of 85 wt %, 5 wt %, and 10 wt %.

The slurry was coated on an aluminum current collector and sufficiently dried in a 120° C. oven, fabricating an electrode.

This electrode was cut to have an area of 2 cm² and was used as a negative electrode.

On the other hand, 80 wt % of activated carbon having a specific surface area of 1450 m²/g, 10 wt % of a carbon black conductive material, and 10 wt % of a polyvinylidene fluoride binder were mixed to prepare active material slurry. The active material slurry was coated on an aluminum current collector and sufficiently dried in a 120° C. oven, fabricating an electrode.

This electrode was cut to have an area of 2 cm² and was used as a positive electrode.

The positive and negative electrodes and an electrolyte solution prepared by dissolving 1 mol of $LiBF_4$ in a propylene carbonate solvent were used to fabricate an asymmetric capacitor.

This asymmetric capacitor was charged and discharged with a working voltage ranging from 0 to 3.0V.

COMPARATIVE EXAMPLE 13

The asymmetric capacitor of Comparative Example 12 was charged and discharged with a working voltage ranging from 0 to 4.2V.

The asymmetric capacitors according to Examples 13 to 18 and Comparative Examples 9 to 13 were measured regarding capacitance and resistance. The results are provided in the following Table 4.

TABLE 4

| | Electrode | Cell materials | Salt | Working voltage (V) | Capacitance (F/g) (1.0 mA/cm²) | Energy density (Wh/kg) (1.0 mA/cm²) |
|---|---|---|---|---|---|---|
| Example 13 | positive electrode | Example 1 | $Et_4NBF_4$ | 3.0 | 27 | 33.8 |
| | negative electrode | activated carbon | | | | |
| Example 14 | positive electrode | activated carbon | $Et_4NBF_4$ | 3.0 | 25 | 31.3 |
| | negative electrode | Example 1 | | | | |
| Example 15 | positive electrode | Example 1 | $LiBF_4$ | 3.0 | 29 | 36.3 |
| | negative electrode | activated carbon | | | | |
| Example 16 | positive electrode | activated carbon | $LiBF_4$ | 3.0 | 28 | 35 |
| | negative electrode | Example 1 | | | | |
| Example 17 | positive electrode | activated carbon | $LiBF_4$ | 4.2 | 30 | 73.5 |
| | negative electrode | Example 1 | | | | |
| Example 18 | positive electrode | Example 1 | $LiBF_4$ | 4.2 | 21 | 51.5 |
| | negative electrode | activated carbon | | | | |
| Comparative Example 9 | positive electrode | Comparative Example 1 | $Et_4NBF_4$ | 3.0 | 15 | 18.8 |
| | negative electrode | activated carbon | | | | |
| Comparative Example 10 | positive electrode | activated carbon | $Et_4NBF_4$ | 3.0 | 13 | 16.3 |
| | negative electrode | Comparative Example 1 | | | | |
| Comparative Example 11 | positive electrode | Comparative Example 2 | $LiBF_4$ | 3.0 | 16 | 20 |
| | negative electrode | activated carbon | | | | |

TABLE 4-continued

| | Electrode | Cell materials | Salt | Working voltage (V) | Capacitance (F/g) (1.0 mA/cm$^2$) | Energy density (Wh/kg) (1.0 mA/cm$^2$) |
|---|---|---|---|---|---|---|
| Comparative Example 12 | positive electrode negative electrode | activated carbon Comparative Example2 | LiBF$_4$ | 3.0 | 14 | 17.5 |
| Comparative Example 13 | positive electrode negative electrode | activated carbon Comparative Example2 | LiBF$_4$ | 4.2 | 15 | 36.8 |

As shown in Table 4, Examples 13 to 16 maintained a working voltage of 3.0V, even though either of their positive and negative electrodes included a carbon material with controlled interlayer spacing.

In addition, as shown in Examples 17 and 18, the capacitors including a carbon material with controlled interlayer spacing in a negative electrode or a positive electrode had excellent capacitance in a wide operation range from 0 to 4.2V, and thus may be applied in various areas.

When a capacitor works in a wide operation range in this way, it may have good energy density.

As a result, Examples 13 and 16 had energy density ranging from 30 Wh/kg to 40 Wh/kg, and Example 17 had very high energy density of 73.5 Wh/kg.

Comparative Examples 9, 10, 11, and 12 including expanded graphite as positive and negative electrodes had very small interlayer spacing, so it may be difficult for ions (Li+, Et4N+ and BF4−) to be inserted therein, resultantly having decreased capacitance.

In particular, Comparative Example 13 operated at 0 to 4.2V had a negative electrode potential decreased down 1V or less, and thus produced more SEI due to a large surface area, while having small capacitance. In addition, even though it had a wide working voltage range, it had remarkably lower energy density than Examples 17 and 18.

This result shows that the carbon material of Example 1 had a peak height ratio (b/a) of 0.5 between a height peak (a) at 2θ=23.5° and another peak height (b) at 2θ=26° when X-ray diffraction was measured using CuKα ray.

While this disclosure has been described in connection with what is presently considered to be practical embodiments, it is to be understood that this disclosure is not limited to the disclosed embodiments, but, on the contrary, is intended to cover various modifications and equivalent arrangements included within the spirit and scope of the appended claims.

Therefore, the above-mentioned embodiments are exemplary but do not limit in any sense.

What is claimed is:

1. A crystalline carbon material, comprising:
a crystal structure including a plurality of atom layers with a controlled interlayer spacing between two adjacent atom layers formed in a crystal plane (002), the controlled interlayer spacing represented by peaks of the crystal plane (002), measured by a X-ray diffraction using CuKα ray, at scattering angles of the CuKα ray 23°±5.0° and 26.5°±1.0°, with the peak height at the scattering angle of the CuKα ray 23°±5.0° being higher than the one at the scattering angle 26.5°±1.0°.

2. The crystalline carbon material of claim 1, wherein the crystalline carbon material is a crystalline carbon material for a capacitor.

3. The crystalline carbon material of claim 1, wherein the crystalline carbon material is a crystalline carbon material for an asymmetric capacitor.

4. The crystalline carbon material of claim 1, wherein the crystalline carbon material has a peak ratio (b/a) ranging from 0.01 to 0.99 between the peak height (b) at 2θ=26.5°±1.0° and the peak height (a) at 2θ=23°±5.0°.

5. The crystalline carbon material of claim 1, which has interlayer spacing d002 ranging from 0.34 nm to 1 nm measured by the X-ray diffraction using the CuKα ray.

6. The crystalline carbon material of claim 1, having a surface area ranging from 5 m$^2$/g to 100 m$^2$/g.

7. The crystalline carbon material of claim 1, having a tap density ranging from 0.5 g/cc to 1.5 g/cc.

8. The crystalline carbon material of claim 1, wherein the crystalline carbon material is natural graphite, artificial graphite, mesophase carbon microbeads, or a combination thereof.

9. A method of manufacturing a carbon material with a controlled interlayer spacing, comprising:
oxidizing the crystalline carbon by adding an oxidizing agent into a mixture of crystalline carbon and acid;
drying the oxidized crystalline carbon;
primarily heat-treating the product dried under a vacuum environment by increasing a temperature at an increasing rate of 0.3° C./min to 5° C./min to a first temperature ranging from 150 to 250° C.; and
secondarily heat-treating the product primarily heat treated under an inert atmosphere environment by increasing a temperature at an increasing rate of 1° C./min to 10° C./min to a second temperature ranging from 250 to 600° C. and maintaining the product secondarily heat treated at the second temperature increased.

10. The method of claim 9, wherein the oxidizing agent is added to the mixture by 10 to 100 steps in an amount ranging from 5 to 15 parts each step by weight based on 100 parts by weight of the crystalline carbon.

11. The method of claim 10, wherein the oxidizing agent is entirely added in an amount of 50 to 700 parts by weight based on 100 parts by weight of the crystalline carbon.

12. The method of claim 9, wherein the crystalline carbon comprises natural graphite, artificial graphite, mesophase carbon microbeads, or a combination thereof.

13. The method of claim 9, wherein the acid comprises H$_2$SO$_4$, HNO$_3$, H$_3$PO$_4$, H$_4$P$_2$O$_7$, H$_3$AsO$_4$, HF, H$_2$SeO$_4$, HClO$_4$, CF$_3$COOH, BF$_3$(CH$_3$COOH)$_2$, HSO$_3$F, H$_5$IO$_6$, or a combination thereof.

14. The method of claim 9, wherein the oxidizing agent comprises KMnO$_4$, NaNO$_3$, KClO$_3$, NaClO$_3$, NH$_4$ClO$_3$, AgClO$_3$, HClO$_3$, NaClO$_4$, NH$_4$ClO$_4$, CrO$_3$, (NH$_4$)$_2$S$_2$O$_8$, PbO$_2$, MnO$_2$, As$_2$O$_5$, Na$_2$O$_2$, H$_2$O$_2$, N$_2$O$_5$, or a combination thereof.

15. The method of claim 9, wherein the vacuum ranges from 0.01 mbar to 0.1 mbar.

16. The method of claim 9, wherein the product primarily heat treated is maintained at the increased temperature for 1 to 24 hours.

17. A crystalline carbon, comprising:
a plurality of atom layers with a controlled interlayer spacing between two adjacent atom layers,
the controlled interlayer spacing comprising a first interlayer spacing and a second interlayer spacing where the second interlayer spacing is larger than the first interlayer spacing, and
the second and first interlayer spacings respectively represented by peaks of a crystal plane (002), measured by X-ray diffraction using CuKα ray, at scattering angles of the CuKα ray 23°±5.0° and 26.5°±1.0°.

18. The crystalline carbon of claim 17, wherein the crystalline carbon has the controlled interlayer spacing ranging from 0.34 nm to 1 nm measured by X-ray diffraction using a CuKα ray.

19. The crystalline carbon of claim 17, wherein the crystalline carbon has a surface area ranging from 5 $m^2$/g to 100 $m^2$/g.

20. The crystalline carbon of claim 17, wherein the crystalline carbon has a tap density ranging from 0.5 g/cc to 1.5 g/cc.

* * * * *